United States Patent [19]
Leach

[11] 3,800,919
[45] Apr. 2, 1974

[54] WHEEL HUB WITH FLOATING BRAKE BAND AND FLOATING AXLE

[75] Inventor: Raymond B. Leach, Omaha, Nebr.

[73] Assignee: Hill City Mfg., Inc., Hill City, Kans.

[22] Filed: Aug. 10, 1972

[21] Appl. No.: 279,981

[52] U.S. Cl. .................................................. 188/26
[51] Int. Cl. .............................................. B62l 5/12
[58] Field of Search ............... 188/24, 26, 167, 338; 308/198

[56] References Cited
UNITED STATES PATENTS
| | | | |
|---|---|---|---|
| 2,172,774 | 9/1939 | Sayles | 188/24 |
| 2,629,976 | 3/1953 | Osplack | 308/198 UX |
| 2,759,243 | 8/1956 | Smith | 308/198 X |

FOREIGN PATENTS OR APPLICATIONS
| | | | |
|---|---|---|---|
| 415,418 | 8/1934 | Great Britain | 188/24 |

Primary Examiner—Duane A. Reger
Attorney, Agent, or Firm—Clarence A. O'Brien; Harvey B. Jacobson

[57] ABSTRACT

A wheel hub incorporating an outer annular member and an inner annular member with the outer annular member being connected with a supporting wheel structure or the like and the inner annular member being connected with an axle. The inner and outer annular bearing members are rotatably interconnected by axially spaced bearing assemblies with a floating internal brake band non-rotatably associated with the inner annular member and selectively frictionally engaged with the interior of the outer annular member when expanded to serve as a brake. In another embodiment of the invention, the wheel hub is provided with a floating axle that is resiliently supported from an inner annular member.

8 Claims, 9 Drawing Figures

PATENTED APR 2 1974 3,800,919

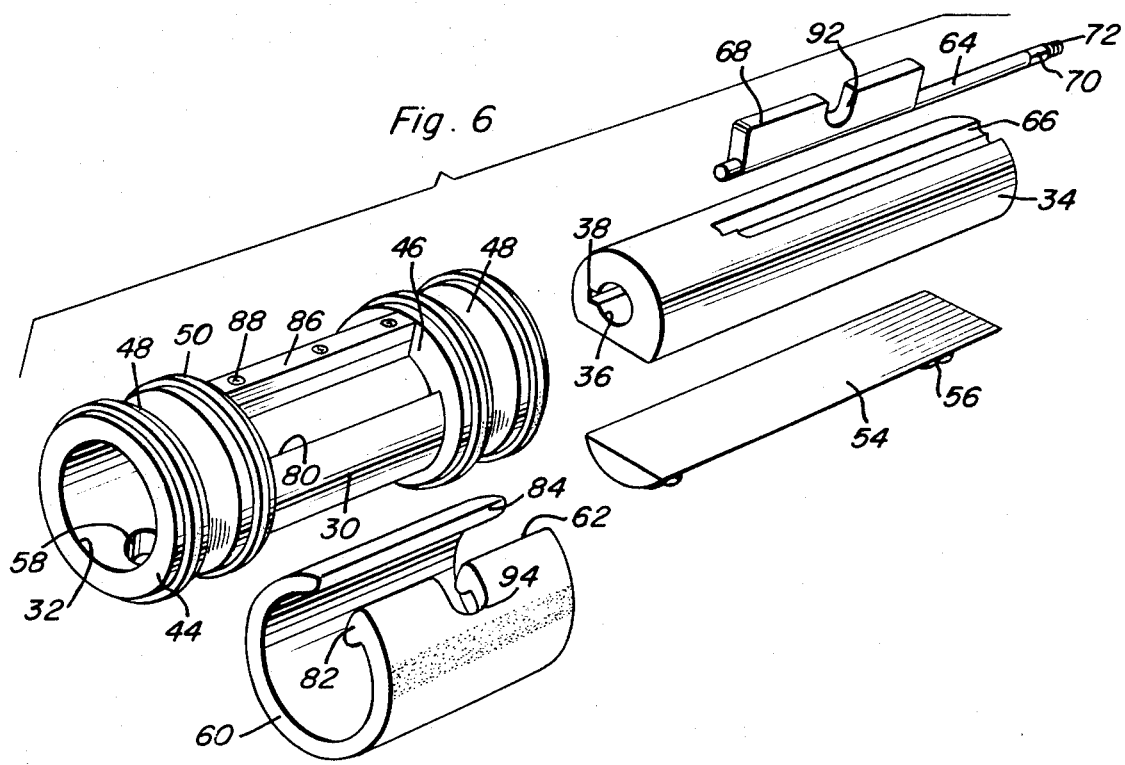
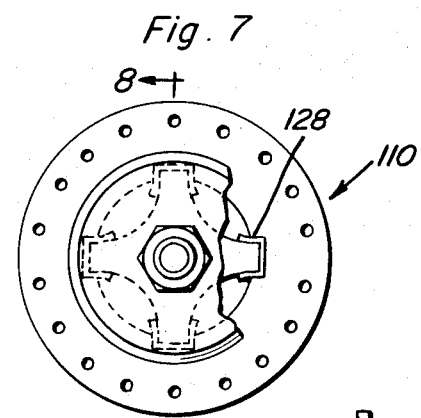
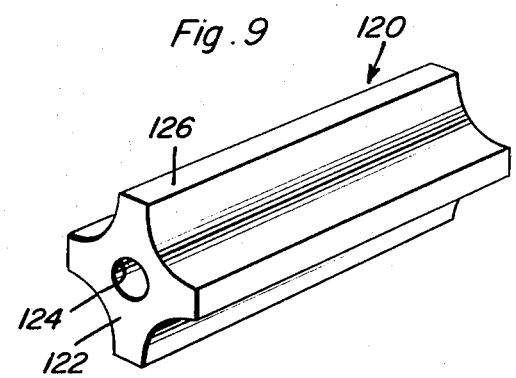
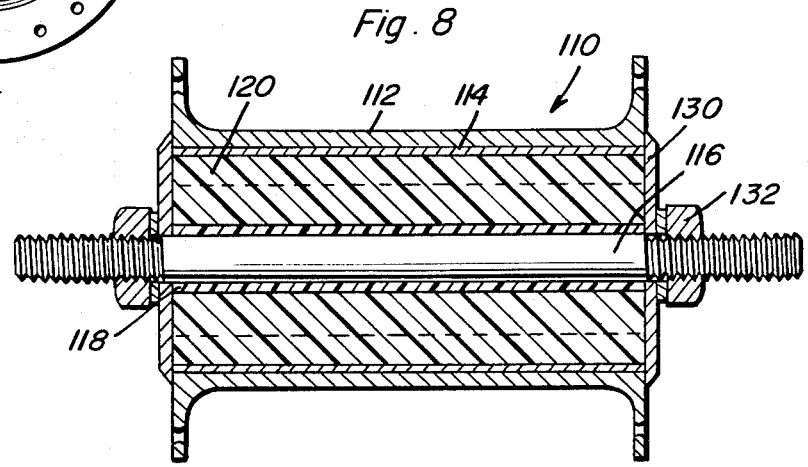

WHEEL HUB WITH FLOATING BRAKE BAND AND FLOATING AXLE

BACKGROUND OF THE INVENTION

1. Field of the Invention

The present invention generally relates to a wheel hub and more particularly a wheel hub incorporating a novel and unique bearing assembly and floating brake band oriented internally of the hub and expandable internally of an outer annular member forming part of the hub together with a resiliently supported floating axle associated with the wheel hub.

2. Description of the Prior Art

Many wheel hubs have been provided in which a brake has been associated with the rotatable component of the hub in order to impart a braking action thereto. However, previously known devices have usually employed brake bands which are disposed externally of a rotating surface which collapses into gripping engagement therewith, axially compressible disk elements and the like. Prior brake assemblies associated with wheel hubs have been rather complicated and materially enlarged the size of the hub. Also, resilient hub structures have been provided in which the axle or shaft through the hub can move laterally in relation to the periphery of the hub. However, substantial problems of operation and cost of such devices have apparently materially reduced their acceptance in the production of wheels for various purposes.

SUMMARY OF THE INVENTION

An object of the present invention is to provide a wheel hub incorporating an outer annular rotatable member journaled on an inner annular member with a floating brake band being interposed between the annular members and non-rotative in relation to the inner annular member and expandable and contractible for frictional engagement with the interior of the outer annular member to form a brake for the wheel hub.

Another object of the invention is to provide a wheel hub in which the bearing components between the inner and outer annular members are inserted through an opening in the inner annular member after which a closure is provided for the opening for retaining the bearing members, which are in the form of ball members, within bearing races in the inner and outer annular members.

A further object of the present invention is to provide a wheel hub incorporating a resiliently supported axle or shaft therein to enable floating movement of the axle in relation to the hub within the limits of the resilient connection between the axle and hub.

A still further object of the invention is to provide a wheel hub in accordance with the preceding objects which is relatively simple in construction, well adapted for many uses and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is an exploded group perspective view of the structure of FIG. 5 illustrating the principal components of the wheel hub.

FIG. 7 is an end view of a wheel hub incorporating a resilient insert for supporting the axle.

FIG. 8 is a longitudinal, sectional view taken substantially upon a plane passing along section line 8—8, on an enlarged scale, illustrating the specific construction of the wheel hub.

FIG. 9 is a perspective view of the resilient insert incorporated into the wheel hub.

DESCRIPTION OF THE PREFERRED EMBODIMENTS

Figure 1:
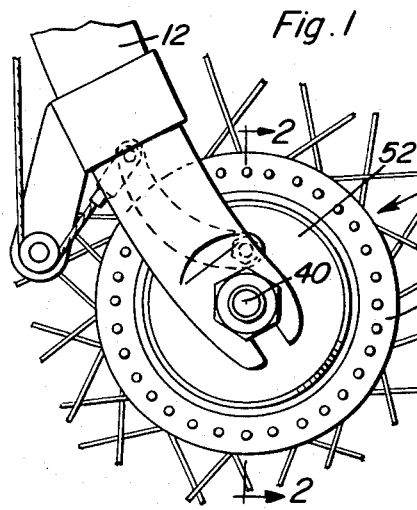
FIG. 1 is a side elevational view of the wheel hub of the present invention incorporated into a wheel structure illustrating the mechanism for actuating the brake.
Figure 5:
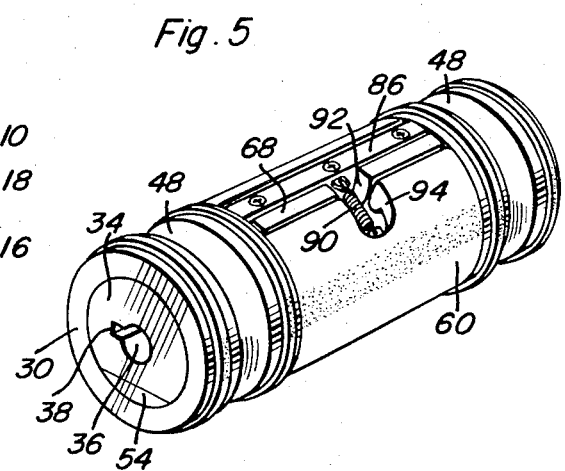
FIG. 5 is a perspective view of the inner annular member and the brake band associated therewith.

Referring now specifically to the drawings, the wheel hub of the present invention is generally designated by reference numeral 10 and in FIG. 1, the wheel hub is illustrated in association with the supporting fork 12 of a bicycle frame or the like with it being understood that the wheel hub may be employed in various arrangements.

The hub 10 includes an outer annular or cylindrical member 14 having peripheral end flanges 16 mounted thereon which have apertures therein receiving wheel spokes 18 which may be conventional wire spokes such as employed in bicycle wheel structures. The internal surface of the outer annular member 14 is cylindrical and substantially smooth as indicated by reference numeral 20 with an internal peripheral bearing race 22 provided at each end thereof in which the peripheral race is semi-cylindrical or partially cylindrical in cross-sectional configuration for partially receiving a plurality of ball bearings 24 that are retained in spaced relation by a spacer strip 26 of Teflon material or the like with the spacer strip being partially received in an annular recess 28 formed in the internal surface of the annular member 14 on both sides of the bearing recess 22.

Figure 2:
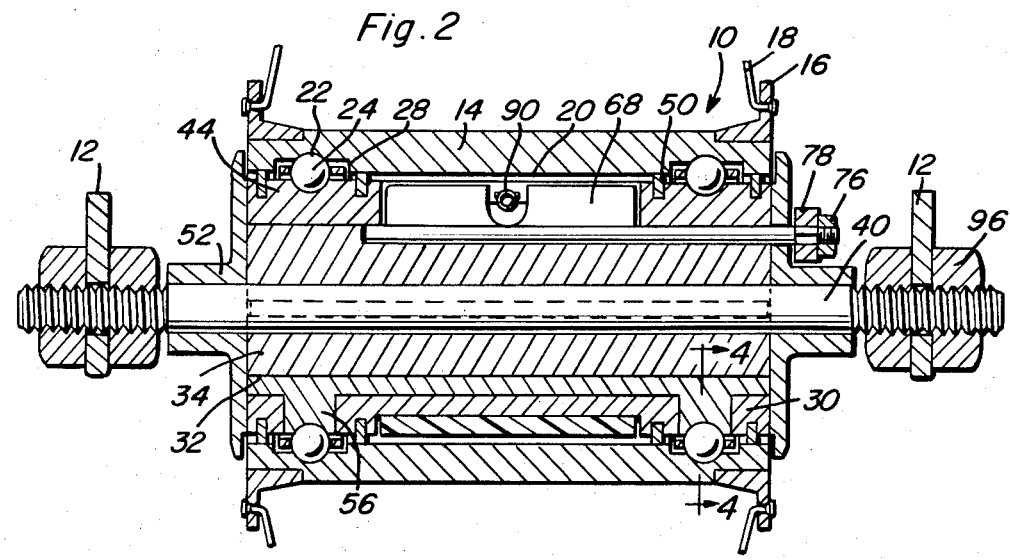
FIG. 2 is a vertical sectional view, taken substantially upon a plane passing along section line 2—2, on an enlarged scale, illustrating the specific construction of the wheel hub.
Figure 3:
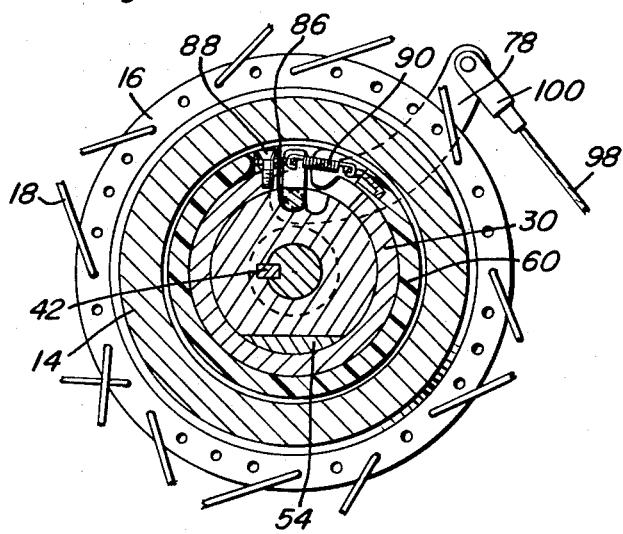
FIG. 3 is a transverse, vertical sectional view of the wheel hub.
Figure 4:
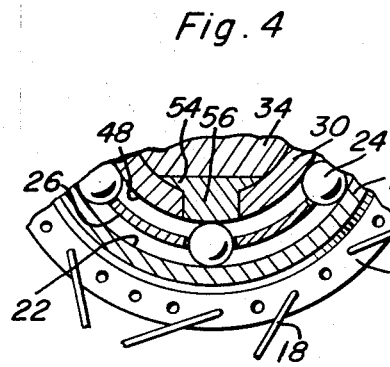
FIG. 4 is a fragmental view, on an enlarged scale, taken substantially upon a plane passing along section line 4—4 of FIG. 2 illustrating the bearing structure incorporated into the hub.

Disposed internally of the outer annular member 14 is an inner annular member 30 that has a length approximately the same as the member 14 as illustrated in FIG. 2.

The inner annular member includes a hollow central area 32 receiving a substantially cylindrical insert 34 that includes a longitudinal bore 36 extending therethrough having a longitudinal keyway 38 communicating therewith. The bore 36 receives an elongated axle 40 which is keyed to the keyway 38 by a longitudinal key 42 received partially in the keyway 38 and partially in a corresponding keyway in the axle 40. Thus, the axle 40 is rigidly connected to the cylindrical insert 34 and the insert 34 is received within the bore 32 in the inner annular member 30. The inner annular member 30 includes a pair of relatively thick end portions 44 which are spaced from each other and define opposed shoulders 46 which extend peripherally of the inner annular member 30 and each of which has a peripheral bearing race 48 therein which is generally semi-cylindrical in cross-sectional configuration and in opposed relation to the bearing race 22 for partially receiving the ball bearings 24 which thus journal the outer annular member 14 on the inner annular member 30 and prevent relative axial movement therebetween. Also, each end portion 44 is provided with a pair of seals 50 received in appropriate grooves on opposite sides of the bearing races and bearings to retain lubrication and exclude dust and other foreign material from the bearing assemblies.

Each end of the wheel hub is provided with a dust cap 52 which is mounted on the axle 40 and forms a plate-like closure for the ends of the wheel hub with the outer periphery of the dust caps extending beyond the inner edge of the rotary outer annular member 20 as illustrated in FIG. 2.

In order to enable insertion of the ball bearings, the insert 34 has a chordal segment thereof removed and replaced by a correspondingly shaped closure plug carrying member 54 which includes a pair of spaced closure plugs 56 which project through corresponding holes 58 that extend through the inner annular member 30 and communicate with the bearing races 48 with the outer ends of the plugs 56 being shaped to conform with the transverse curvature of the bearing races so that the bearing members 24 may move freely in the bearing races with the spacer strip 26 retaining the ball bearing members in spaced relation. The bearing spacer strip 26 will be positioned in the recess 28 provided therefor prior to insertion of the bearings and will have the appropriate number of holes for receiving the ball bearing members 24 thus serving as a spacer for the ball bearing members and providing self-lubrication therefor.

Disposed between the shoulders 46 is a one-piece, generally cylindrical brake band 60 which has a longitudinal slit 62 formed therein to enable expansion and contraction of the brake band 60 which is constructed of a resilient material such as a rubber or plastic material impregnated with wear resistant and friction producing material or any other suitable material normally employed in brake band structures. For expanding the brake band 60, an elongated rod 64 is disposed within a longitudinal recess 66 in the external surface of the insert 34 and is journaled thereby in such a manner that a projecting blade or wing 68 thereon will swing in an arcuate manner when the rod 64 is oscillated about its longitudinal axis. The outer end of the rod 64 is provided with a square or polygonal area 70 and a screw-threaded end portion 72 for receiving a retaining nut 76 which retains an actuating arm 78 attached to the shaft or rod 64 as illustrated in FIG. 2 so that when the arm 78 which has a square or polygonal aperture therethrough is engaged with the square area 70 and retained in position by the retaining nut 76, arcuate movement of the arm 78 will cause swinging movement of the actuating projection or blade 68. The blade 68 extends through a slot-like opening 80 in the inner annular member 30 and into the slit structure or slot-type structure in the brake band 60 for engagement with a rounded and enlarged end edge portion 82 of the brake band 60 which forms one edge of the slot-like opening 62 as illustrated in FIG. 6. The opposite edge of the slot 62 which is designated by numeral 84 is disposed in abutting relation to a bar 86 mounted on the exterior of the inner annular member in alignment with one edge of the slot 80 therein as illustrated in FIG. 6 with the bar being secured in position by screw-threaded fasteners 88 or the like. Thus, with this construction, the brake band 60 is fully and freely floating in encircling relation to the inner annular member with the edge 84 of the slot abutting the bar 86 and the actuating projection or blade 68 projecting out through the slot 80 in the inner annular member 30 and engaging the enlarged and rounded edge 82 of the brake band 60 so that when the shaft or rod 84 is pivoted in a direction to move the blade 68 into engagement with the edge 82 and then continued movement of the blade 68 in that direction will cause the brake band to expand into frictional and braking engagement with the inner surface 20 of the outer annular member 14 which is, in effect, a brake drum thus retarding rotational movement of the outer annular member 14 in a well known manner.

While the inherent resiliency of the brake band 60 will normally return it to its retracted or unexpanded condition when the actuating arm 78 is returned to its normal position, in some instances, a return spring may be desired which has been illustrated as a tension coil spring 90 extending between the bar 86, through a notch 92 in the blade 68 and into a notch 94 in the edge 82 of the brake band 60 with the ends of the tension spring 90 being connected with suitable insert lugs for resiliently returning the brake band 60 to a retracted position. If desired, the spring 90 may be positioned to interconnect the two edges 82 and 84 of the band 60 to retract the brake band.

With the hub assembled and mounted on a supporting framework such as a bicycle frame 12 by the use of nuts 96 engaging the bifurcated end of the frame 12 and being threaded on the axle 40 in a conventional manner, the wheels supported by the spokes 18 in a conventional manner may rotate and are, of course, supported and journaled by the bearing members 24. An actuating cable or rod 98 having a clevis 100 on the end thereof is engaged with the actuating arm 78 for the brake and may be entrained over a guide roller or the like if necessary and extend to an operating mechanism such as a brake pedal or squeeze type handle to actuate and release the brake band by pivoting the shaft or rod 64 thus expanding the brake band 60 in one direction and permitting it to retract in the other direction with the brake band being fully floating so that the wear characteristics thereof will be constant throughout the surface area thereof and to provide a large braking surface for providing a brake that will be long lasting and produce an effective braking action for retarding rotation of the wheel in a desired manner.

FIG. 7–8 illustrate another embodiment of the hub designated by numeral 110 including an outer annular member 112 and an inner annular member 114 journalled therefrom with a central axle 116, received in a sleeve 118 or the like, being supported from the inner annular member 114 by a resilient member generally designated by the numeral 120 and illustrated in FIG. 9. The resilient member 120 includes a central body portion 122 having a bore 124 therethrough receiving the axle 116 and sleeve 118. Projecting radially from the body 122 is a plurality of ribs or projections 126 which are engaged in and received in inwardly facing U-shaped channels 128 that are rigidly fixed with the inner annular member 114. Thus, the resilient insert 120 enables the axle 116 to float in relation to the inner annular member 114 due to the resilient characteristics of the body 112 and the ribs 126. The resilient insert may be of various materials including molded polyurethane and the sleeve may be in the form of a nylon material or the like. A dust cap 130 is provided for each end of the hub with the dust cap being retained in position by a threaded nut 132 or the like with the axle 116 being supported from any suitable support in a well known manner.

While the resilient insert 120 has been illustrated in conjunction with a simplified hub structure, it is pointed out that it is comtemplated that the resilient insert could be incorporated into the hub with the floating brake band illustrated in FIGS. 1 and 2 and also with the wheel hub structure including the bearings and employing the same manner of inserting the ball bearings as illustrated in FIGS. 1–6. With the resilient hub insert, the suspension of the hub in relation to the axle is accomplished and the shock absorbing and cushioning characteristics of the resilient insert are active in any revolving position of the revolving component of the hub.

It is also contemplated that the metal channels 128 receiving the ribs 126 of the resilient insert may be press-fitted or otherwise rigidly fixed to an outer annular member such as the hub member 112 and the sleeve 118 may rotate on the axle 116 in which event the axle becomes the inner member or the sleeve may be rigid with the axle and rotate in relation to the body 122 thereby providing flexibility of utility and installation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hub for mounting on an axle comprising an inner annular member and an outer annular member supported on the inner annular member for relative rotation, said inner annular member having a periphal bearing race on the external surface thereof, said outer annular member having a bearing race on the internal surface thereof, said inner annular member having a hollow interior, and a hole extending from the hollow interior to the bearing race on the external surface thereof, a plurality of ball bearing members disposed in the bearing races to facilitate relative rotation between the inner and outer annular members and prevent axial movement therebetween, said hole enabling insertion of the bearing members into the bearing races, a closure plug for said hole, and means insertable into the hollow interior of the inner annular member for retaining the closure plug in position, the inner and outer annular members having axially spaced bearing races therein and bearing members associated therewith, and a brake structure interposed between the inner and outer members for retarding rotation of the outer annular member.

2. The structure as defined in claim 1 wherein said brake structure includes a one-piece resilient band of substantilly cylindrical configuration received on the inner annular member and having a periphery disposed closely adjacent the inner surface of the outer annular member with the brake band including a longitudinal slot therein, and means carried by the inner annular members for expanding the brake band to engage with the outer annular member.

3. The structure as defined in claim 2 wherein said inner annular member is provided with a longitudinal abutment on the outer surface thereof engaging one edge of the slot in the brake band with the brake band being freely floating in relation to the inner annular member, said means for expanding the brake band including an oscillatory actuator engaging the opposite edge of the slot in the brake band to effectively increase the outside circumference of the brake band when moved away from the edge of the slot in the brake band engaging the abutment.

4. The structure as defined in claim 3 wherein said brake band is received in an annular recess in the inner annular member, said insert means in the inner annular member having a slot-like recess extending longitudinally therein, said actuator for the brake band being received in the recess and including a projecting rib extending radially from the recess for engaging the edge of the slot in the brake band opposite to the edge of the slot in the brake band which engages the abutment on the inner annular member.

5. In a hub structure comprising an outer annular member rotatably supported on an inner annular member, a longitudinally slit cylindrical brake band interposed between the inner and outer annular members in free floating relation to both members, abutment means on said inner annular member abuttingly engageable by one edge of the slit in the brake band, actuating means on said inner annular member to engage the other edge of the slit in the brake band to expand the brake band into frictional braking engagement with the inner surface of the outer annular member and cooperate with the abutment means to prevent rotation of the brake band in relation to the inner annular member, and resilient means extending across the actuating means and connected to the edge of the slit in the band engaged by the actuating means to contract the brake band when the actuting means is inoperative.

6. In a hub structure comprising an outer annular member rotatably supported on an inner annular member, a longitudinally slit cylindrical brake band interposed between the inner and outer annular members in free floating relation to both members, abutment means on said inner annular member abuttingly engageable by one edge of the slit in the brake band, and actuating means on said inner annular member to engage the other edge of the slit in the brake band to expand the brake band into frictional braking engagement with the inner surface of the outer annular member and cooperate with the abutment means to prevent rotation of the brake band in relation to the inner annular member, each of said inner and outer annular members having axially spaced bearing races in registry with each other, a plurality of ball bearings partially received in each pair of races to facilitate relative rotation and prevent relative axial movement between the annular members, said inner annular member being hollow and provided with holes communicating the hollow interior thereof with the bearing races to enable insertion and removal of the ball bearings, closure plug means for said holes with the inner ends thereof conforming in configuration to the shape of the bearing races, said brake band being interposed between the bearing races.

7. The structure as defined in claim 6 wherein said actuating means includes an oscillatory rod disposed longitudinally on the inner annular member, a laterally extending means on said rod engageable with the edge of the slit in the brake band, and offset arm means connected with the rod remote from the laterally extending means for oscillating said rod, said abutment means including a longitudinal bar mounted on said inner annular member.

8. The structure as defined in claim 4 wherein resilient contacting means interconnects the abutment and the edge of the slot in the brake band engaged by the rib to contract the brake band when the rib is inoperative, said rib including a notch therein receiving said resilient means.

* * * * *